(12) United States Patent
Sommer et al.

(10) Patent No.: US 10,955,701 B2
(45) Date of Patent: Mar. 23, 2021

(54) FREEFORM OPTICAL STRUCTURES FOR DIRECT-LIT APPLICATIONS

(71) Applicant: Joanneum Research Forschungsgesellschaft mbH, Graz (AT)

(72) Inventors: Christian Sommer, Graz (AT); Claude Leiner, Graz (AT)

(73) Assignee: Joanneum Research Forschungsgesellschaft mbH, Graz (AT)

( * ) Notice: Subject to any disclaimer, the term of this patent is extended or adjusted under 35 U.S.C. 154(b) by 0 days.

(21) Appl. No.: 16/371,559

(22) Filed: Apr. 1, 2019

(65) Prior Publication Data

US 2019/0317366 A1  Oct. 17, 2019

(30) Foreign Application Priority Data

Apr. 13, 2018  (EP) ..................... 18167185

(51) Int. Cl.
*G02F 1/13357* (2006.01)
*F21V 5/00* (2018.01)

(52) U.S. Cl.
CPC ........ *G02F 1/133611* (2013.01); *F21V 5/007* (2013.01); *G02F 1/133602* (2013.01); *G02F 1/133606* (2013.01); *G02F 1/133603* (2013.01); *G02F 2001/133607* (2013.01)

(58) Field of Classification Search
CPC ......... G02F 1/133603; G02F 1/133511; G02F 1/133606; G02F 2001/133607; G02F 1/133611; G02B 6/0088; G02B 6/0023; G02B 6/0028; G02B 6/003; G02B 6/0025; G02B 6/0037; G02B 6/0056; G02B 6/0062; F21V 5/007
See application file for complete search history.

(56) References Cited

U.S. PATENT DOCUMENTS

| 2006/0012993 A1* | 1/2006 | Ohkawa ............... G02B 3/0031 362/240 |
| 2008/0298060 A1* | 12/2008 | Ohkawa ............ G02F 1/133606 362/240 |
| 2014/0056006 A1 | 2/2014 | Jongewaard et al. |
| 2015/0036322 A1 | 2/2015 | Chen |

(Continued)

FOREIGN PATENT DOCUMENTS

WO   WO-2011124393 A1 * 10/2011 ............... F21K 9/00

OTHER PUBLICATIONS

European Search Report for European Application No. 18167185.0 dated Oct. 26, 2018.

(Continued)

*Primary Examiner* — Erin Kryuukova
(74) *Attorney, Agent, or Firm* — Budzyn IP Law, LLC (57) ABSTRACT

An optical apparatus with a distance-to-height ratio, DHR, greater than 2, operable to emit light with a homogenized radiance distribution, the apparatus comprising a plurality of light sources, arranged in an array, a diffusor device at an exit surface of the apparatus, a transparent substrate, arranged between the plurality of light sources and the exit surface, the substrate comprising a plurality of freeform, FF, optical structures wherein the freeform structures are arranged on a bottom side of the transparent substrate facing the light sources.

6 Claims, 8 Drawing Sheets

(56) References Cited

U.S. PATENT DOCUMENTS

2017/0192303 A1*  7/2017  Kang ............... G02F 1/133606
2019/0285950 A1*  9/2019  Liu .................. G02F 1/133608
2019/0310519 A1* 10/2019  Yamamoto ........ G02F 1/133605

OTHER PUBLICATIONS

Leiner, Claude, et al., Smart freeform optics solution for an extremely thin direct-lit application, SPIE Photonics, Apr. 2016, vol. 9889, USA.
Wu, Heng, et al., Double freeform surfaces lens design for LED uniform illumination with high distance-height ratio, Optics and Laser Technology, May 2015, pp. 166-172, vol. 73, Elsevier Ltd.
Hu, Run, et al., A Method to Design Freeform Lens for Uniform Illumination in Direct-Lit LED Backlight with High Distance-Height Ratio, Aug. 2012, pp. 1477, International Conference on Electric Packaging Technology & High Density Packaging, USA.

* cited by examiner

FREEFORM OPTICAL STRUCTURES FOR DIRECT-LIT APPLICATIONS

TECHNICAL FIELD

The invention relates to an optical apparatus with a distance-to-height ratio, DHR, greater than 2, operable to emit light with a homogenized radiance distribution, the apparatus comprising a plurality of light sources, arranged in an array, a diffusor device at an exit surface of the apparatus and a transparent substrate, arranged between the plurality of light sources and the exit surface, the substrate comprising a plurality of freeform, FF, optical structures. The invention further relates to a method for manufacturing freeform optical structures.

BACKGROUND ART

Direct-lit luminaire systems are luminaire systems where the light of one or more light sources, arranged in an array, are directly illuminating an exit surface and/or diffusor device where the light is escaping the luminaire. Suchlike systems have applications in different fields e.g. as backlight units for liquid crystal displays (LCDs) or in general and architectural lighting. A key parameter in such systems is the ratio between the height of the luminaire (distance between the LEDs and the exit surface) and the distance between the different LEDs. This ratio is defined as the DHR value and determines either the minimal height of the luminaire for a fixed array of LEDs or the number of LEDs needed for a given maximal height of the luminaire.

For these applications it is important that the light emitted by the exit surface has a homogenized radiance distribution (watts per solid angle and per unit area). This means that both the intensity is distributed homogenously over the whole surface or diffusor device (=homogenized irradiance distribution) and that the intensity emitted by the surface into the hemisphere is homogenous (=homogenized radiant intensity distribution). Usually in suchlike systems, the homogenization of the irradiance distribution at the diffusor device is reached by choosing an adequate distance between the light sources and the diffusor device in dependence of the distance between the different LEDs.

Without using any additional optical elements in direct lit luminaire systems a DHR value of 1 is hardly achievable. An increase of DHR value is highly desirable because it allows to further reduce the thickness of LCDs and of luminaire systems.

By using an array of individual freeform (FF) optical elements, the DHR value can be significantly increased and the thickness of lit luminaire systems can be significantly decreased. The FF elements have to fulfill two major conditions: First, they have to redistribute the light emitted by the LEDs in a way that a homogenous irradiance distribution within a predefined form is created at the diffusor device and second, to widen the radiant intensity emitted by the LEDs to reach the high DHR values.

The publication "C. Leiner, W. Nemitz, S. Schweitzer, F.-P. Wenzl, C. Sommer, Smart freeform optics solution for an extremely thin direct-lit backlight application, Proc. of SPIE 9889, 988911, (2016)" discloses a general freeform design procedure for calculating FF curves, a simple transformation algorithm to restrict the FF curves to a maximal height and a segmentation algorithm to transform the calculated FF curves into segmented FF structures with circular, square or hexagonal shaped homogeneous irradiance distributions on a diffusor device.

In this publication the use of flat FF micro optical structures with a structure height less than 200 µm for this kind of application is restricted to DHR values lower than 2, because the minimal structure height of these FF structures is restricted by the height of the FF curve parts with positive gradients. The transformation algorithm to restrict the FF curve to a maximal height can only be applied to FF curves which do not surpass the given maximal height, i.e. to curves with negative gradients only, because an intersection of a positive gradient leads to a strong inhomogeneity of the irradiance distribution.

Particularly in the case of FF curves for applications with a high DHR values, the intensity of the radiant intensity distribution of the light source has to be refracted into higher angles to reach a homogenized irradiance distribution on the diffusor device. The propagation angle for the major part of the rays has to be increased by the refraction on the FF surface. Therefore, it is highly likely that at the intersection points, the propagation angle of the refracted propagation angle $\Theta_O$ of refracted rays of the FF-structure is lower than the resulting gradient of the artificial intersection lines and therefore hitting the intersection lines of the FF-structure when using the publicized simple transformation algorithm to restrict the FF curves to a maximal height. This will lead to serious inhomogeneities in the irradiance distribution on the exit surface or diffusor device of the direct-lit luminaire.

The FF curves computed with the FF algorithm are transformed by a rotation about the Y axis into a 3-dimensional FF structures. When rotating 360 degree, the generated optical structures can only create circular irradiance distributions. For the generation of FF structures with non-circular irradiance distributions, the area of the target distribution is divided into individual segments, with separate FF curves being calculated for each segment. A critical parameter is the captured angular range of the individual segments of the FF structures because light which is not captured by the FF structures causes inhomogeneities in the irradiance distribution on the exit surface of the direct-lit luminaire.

The objective of the present invention is to provide an improved method and an improved apparatus mitigating these problems.

SUMMARY OF THE INVENTION

This is achieved by the invention defined in the independent claims. Further embodiments are defined in the sub-claims.

According to the invention the optical apparatus comprises a transparent substrate, arranged between the plurality of light sources and the exit surface, the substrate comprising a plurality of freeform, FF, optical structures wherein the freeform structures are arranged on a bottom side of the transparent substrate facing the light sources. Changing the orientation of the FF structures from a top side to a bottom side (=side facing the LEDs) changes the leading sign of the gradients of the FF curves. In other words, changing the orientation of a FF curve designed for high DHR values from top side to bottom side changes the gradients of the FF curve from mostly positive to mostly negative. This allows an intersection of the FF curve to restrict the maximal height of the FF structure for high DHR values.

In an embodiment of the invention, the freeform optical structures are arranged to define at least one primary irradiance distribution and secondary irradiance distribution on the diffusor device, wherein the at least one primary irradiance distribution is defined by an arrangement of the plurality of light sources and a related first set of FF structures on the substrate, and wherein the secondary irradiance distributions are defined by a periodical arrangement of a second set of FF structures on the substrate in order to achieve a superposition of the secondary irradiance distributions with the at least one primary irradiance distribution. Thereby the higher proportion of unguided light which is no longer affected by the individual segments of the FF structure and overlaps with the desired homogeneous irradiance distributions on the target plane is reduced by distributing the unguided light by additional FF geometries within the secondary target areas.

In an embodiment of the invention, the superposition of the primary and the secondary irradiance distributions of the FF structures are creating a homogenized irradiance distribution on the diffusor device. By choosing suitable geometries for the secondary target areas and using periodically arranged FF structures, an area-wide overlay of the secondary target areas with the primary target areas of adjacent FF structures is achieved.

In an embodiment of the invention the arrangement of the plurality of light sources is hexagonal-shaped or square-shaped. This allows the use of inhomogeneous irradiance distributions within the hexagonal-shaped or square-shaped and the triangular target areas, since by the superposition of both distributions a homogeneous irradiance distribution can be generated on the target.

In an embodiment of the invention, the apparatus further comprises a first spacer component disposed between the array of light sources and the transparent substrate to create a distance between the light sources and the transparent substrate. The first spacer provides a stable distance of the plurality of light sources to the transparent substrate thereby reducing inhomogeneity produced by mechanical stress.

In an embodiment of the invention, the apparatus further comprises a second spacer component disposed between the transparent substrate and the diffusor device to create a distance between the transparent substrate and the diffusor device.

In an embodiment of the invention, the transparent substrate forms a plate and consists of polymethyl methacrylate. PMMA is a cost efficient material with well-known optical properties.

In an embodiment of the invention the apparatus comprises a housing, wherein a surface of the housing is light-absorbing. A housing with a light-absorbing surface reduces scattered light within the housing.

In an embodiment of the invention, the free-form optical structures are manufactured according to the method defined in this application.

Another aspect of the invention relates to a method for manufacturing flat freeform, FF, micro optical structures for direct-lit applications on a substrate to provide a homogenous irradiance distribution of light on a diffusor device, wherein the light is emitted by a plurality of light sources, the method comprising calculating, by an FF algorithm, a geometry of each of the plurality of FF structures on the substrate. Due to artificial intersections within the FF curves and the lateral extension of the light source, errors in the redistribution of the beams occur and result in a reduced homogeneity of the irradiance distribution within the target area. Additionally, impinging light of adjacent LEDs is overlapping with the calculated irradiance distribution. By the calculation of the FF curves, the thickness of the FF structures may be significantly decreased.

In an embodiment of the invention, the method further comprises: simulating a resulting irradiance distribution on the diffusor device and determining at least one compensation factor based on the simulated distribution and providing the at least one compensation factor to the FF algorithm. The resulting irradiance distribution can be determined by a simulation. The method according to the invention is based on an iterative adaptation of the simulation. In the first step, the existing FF algorithm is used to calculate the geometry of the FF structure. In the next step, the resulting irradiance distribution is determined by the simulation, taking into account all relevant factors of the entire optical system. The resulting intensity distribution can then be analyzed. In the third step, compensation factors for a new simulation process are calculated based on the distribution of the intensity within the irradiance distribution. These three steps can be performed iteratively to decrease the intensity variation within the irradiance distribution. The value of the intensity fluctuation is reduced through the iterative application of the compensation factors.

In an embodiment of the invention, the simulation is a ray-tracing simulation, taking into account at least one of the following: a lateral extension of a light source; Fresnel losses on the geometry of the FF structures; intersections of the surfaces of the FF structures; the influence of unguided light rays.

In an embodiment of the invention, the determination of the compensation factor is based on the intensity maxima and/or minima of the simulated distribution. The intensity maxima and/or minima within the target distribution can already be taken into account during the ray-mapping.

In an embodiment of the invention, calculating the geometry of the FF structures further comprises determining an upper threshold and a lower threshold of a thickness of the FF structures, the thickness being related to a maximal height of a FF curve, integrating at least one artificial intersection line into the FF curve when the FF curve drops below the lower threshold and determining a gradient of the artificial intersection line in dependence of a propagation direction of incoming rays from the light sources and the propagation direction of refracted rays inside the FF-structures to minimize light refracted by the intersection line of the FF curve. This algorithm allows the calculation of intersection lines, taking into account the propagation direction of incoming rays from the LEDs and the propagation direction of refracted rays inside the FF-structures. Thereby, the maximal height of the FF curve may be restricted during the calculation process. Light refracted by the artificial intersection lines of the FF-curve is minimized.

In an embodiment of the invention the method further comprises determining an intersection point of a base line of the lower threshold with the FF curve, the intersection point being an element of an intersection line, determining an angle $\Theta_s$ representing the gradient of the intersection line, moving the intersection point towards the upper threshold; creating a construction line using the normal vector of the FF curve in the intersection point and intersecting the construction line with the intersection line to receive a next point of the FF-curve where the calculation of the FF curve is continued.

In an embodiment of the invention the method comprises arranging the FF structures on a side of the substrate facing the light sources. Changing the orientation of a FF curve designed for high DHR values from top side to bottom side changes the gradients of the FF curve from mostly positive to mostly negative. This allows an intersection of the FF curve to restrict the maximal height of the FF structure for high DHR values.

In an embodiment of the invention the method comprises defining at least one primary target area and secondary target areas on the diffusor device, wherein the primary target area is defined by the shape of an arrangement of the plurality of light sources and a related first set of FF structures disposed on the substrate, the first set of FF structures being related to a first irradiance distribution, and wherein the secondary target areas are defined by a periodical arrangement of a second set of FF structures on the substrate, the second set of FF structures being related to a second irradiance distribution, and superimposing the secondary target areas with the primary target areas in order to join the first and the second irradiance distributions in order to obtain a homogenized irradiance distribution on the diffusor device. Thereby the higher proportion of unguided light which is no longer affected by the individual segments of the FF structure and overlaps with the desired homogeneous irradiance distributions on the diffusor device is reduced by distributing the unguided light by additional FF geometries within the secondary target areas. By choosing suitable geometries for the secondary target areas and using periodically arranged FF structures, an area-wide overlay of the secondary target areas with the primary target areas of adjacent FF structures is achieved.

In an embodiment of the invention the primary target areas have the shape of hexagons or squares and secondary target areas have the shape of equilateral triangles. Secondary target areas having the shape of equilateral triangles have the advantage that the equilateral triangles of adjacent FF structures can be superimposed seamlessly within the hexagonal- or square-shaped irradiance distributions of the primary target areas.

In an embodiment of the invention the method comprises forming the substrate to obtain the FF structures, using on of the following: laser lithography, laser ablation, a roll-to-roll printing process.

BRIEF DESCRIPTION OF THE DRAWINGS

Exemplary embodiments of the present invention are described with reference to the attached drawings:

FIGS. 6a-c show an exemplary working scheme of the transformation algorithm to restrict the maximal height of the FF curve during the calculation.

DESCRIPTION OF EMBODIMENTS

Figure 1A:
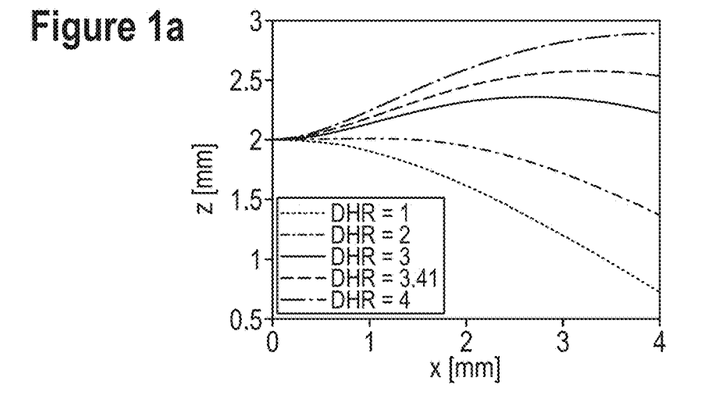
FIGS. 1a-b show a plot of resulting FF curves for bottom side (b) and top side (a) FF structures.
Figure 1B:
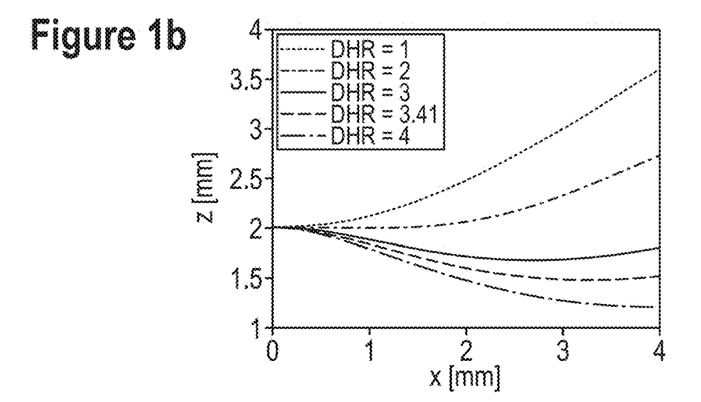

FIGS. 1a-b show a plot of resulting FF curves of structure geometries for bottom side (b) and top side (a) FF structures. FIG. 1a and FIG. 1b show FF curves for different DHR values. The FF curves shown in FIG. 1a are calculated for top side FF structures and the FF curves shown in FIG. 1b are calculated for bottom side FF structures. A bottom side structure is a structure on a side of a substrate facing the light source. FIG. 1a shows that only the FF curves with a DHR value<2 have negative gradients and can be intersected. FIG. 1b shows, that for bottom side structures, the leading sign of the gradients changes and only curves with DHR>3 have mainly negative gradients. Based on these results, the method and the apparatus according to the invention use structures located on the bottom side of the substrate or substrate foil.

Figure 2A:
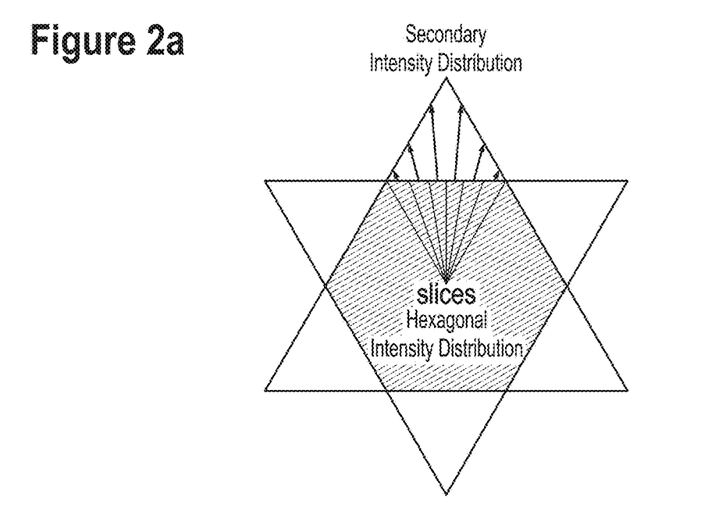
FIGS. 2a-b show a schematic illustration of primary and secondary target areas.
Figure 2B:
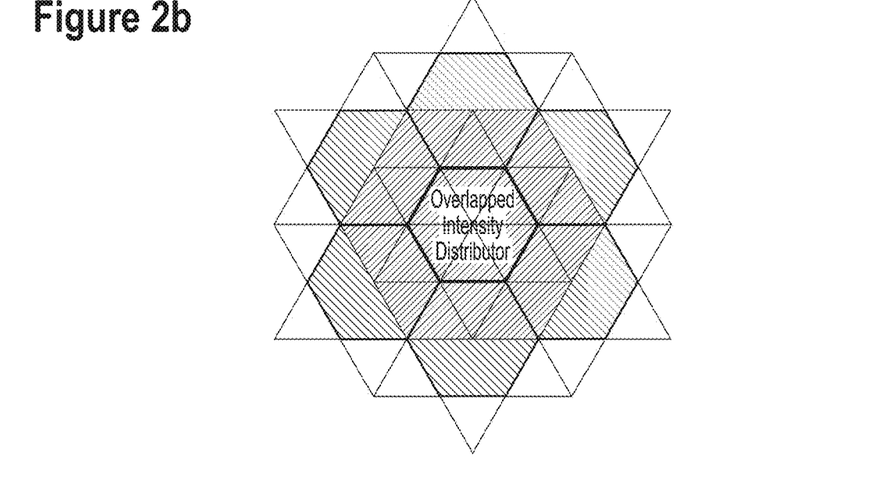

FIGS. 2a-b show a schematic representation of primary and secondary target areas for segmented FF structures with hexagonally shaped primary irradiance distributions. FIG. 2a shows that the segmented FF structure generates a hexagonal-shaped intensity distribution. Further FF geometries redistribute the intensity not captured by the angular adjustment of the individual segments of the structure into secondary triangular shaped irradiance distributions. FIG. 2b shows that the chosen form of the secondary target distributions has the advantage that the equilateral triangles of adjacent FF structures can be superimposed seamlessly within the hexagonal irradiance distribution. This approach even allows the use of inhomogeneous irradiance distributions within the hexagonal and the triangular target areas, since only by the superposition of both distributions a homogeneous irradiance distribution has to be generated on the target.

Figure 3A:
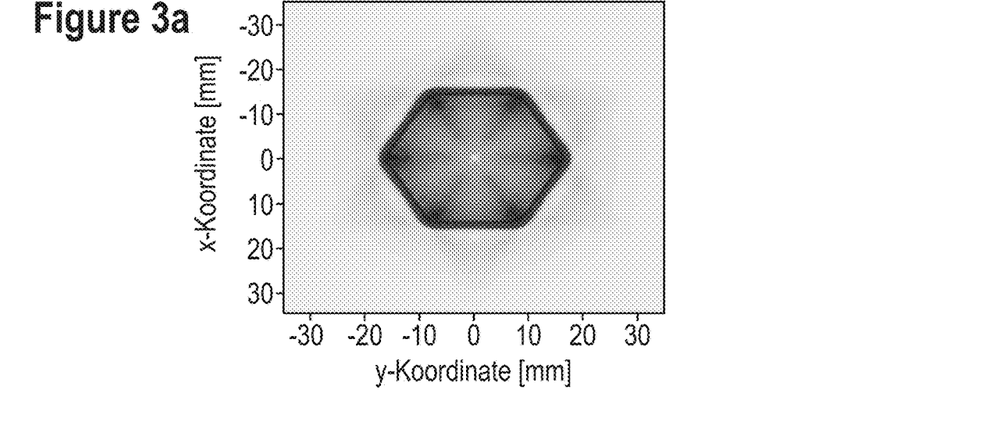
FIGS. 3a-f show simulated irradiance distributions of a FF structure with a hexagonal primary target distribution and triangular secondary target distributions for different iteration steps.
Figure 3B:
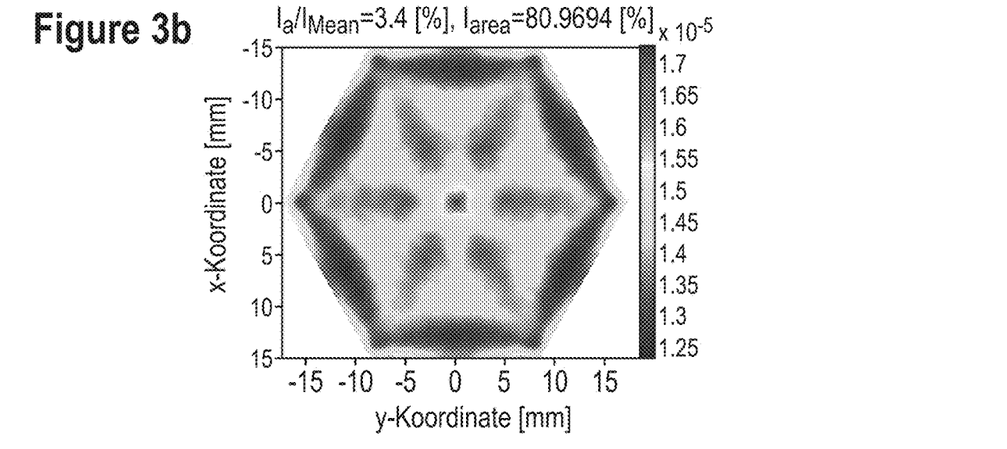

FIGS. 3a-f show a change in the generated intensity distribution due to iterative ray-mapping. FIGS. 3a, c, e show the simulated irradiance distributions of an FF structure with hexagonal primary target distribution and triangular secondary target distributions for different iteration steps. To obtain the irradiance distributions of FIGS. 3b, d, f, the irradiance distribution of the hexagonal primary target distribution is superimposed with the irradiance distributions of the triangular secondary target distributions of 6 adjacent FF structures. This corresponds to the resulting intensity distribution on the diffusor device of the lighting apparatus when the FF structures are arranged in a periodic array, see FIG. 3b. The distance between light source and target distribution was taken to be 10 mm, the incircle radius (=shortest segment) of the hexagonal primary target distribution of the FF structure used was assumed to be 15.05 mm. Thus, the FF structure has a DHR of −3. The simulations were carried out with 20 million beams emitted by an extended light source with an area of 0.5×0.5 mm². FIGS. 3a, b show the intensity distributions without using the compensation factors. FIG. 3b shows that the superimposed intensity distribution of the FF structure with hexagonal target distribution implies a low value of intensity variation (3.4%). The target area was subdivided into 201×201 pixels, where $x_m$ and $y_n$ are indices for the x- and y-position of the pixels (m,n=1, 2, . . . , 201=M,N). By assigning the rays depending on their positional ray data to their respective pixel $(x_m, y_n)$ and accumulating their flux, an array of the intensities I $(x_m, y_n)$ in the target area was obtained. In order to evaluate the value of intensity variation in the target area, the arithmetical mean deviation was calculated by using the following equation:

$$\frac{I_a}{I_{Mean}} = \frac{\frac{1}{MN}\sum_{m=1}^{M}\sum_{n=1}^{N}|I(x_m, x_n) - I_{Mean}|}{I_{Mean}}$$

where $I_{mean}$ is the average intensity value of $I(x_m,y_n)$. In this definition a smaller value represents a higher degree of uniformity.

Figure 3C:
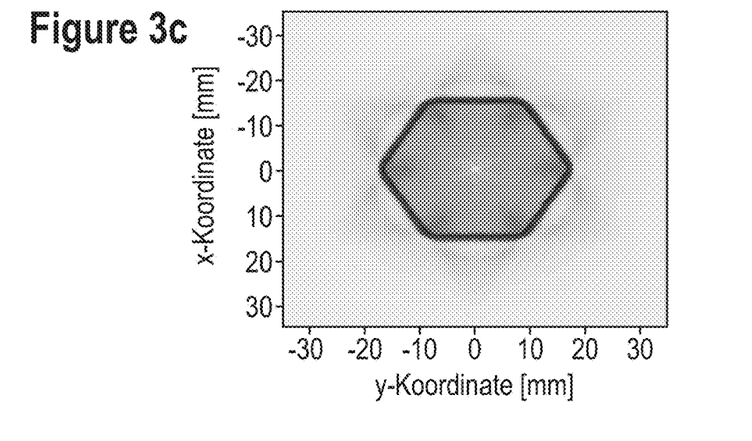
Figure 3D:
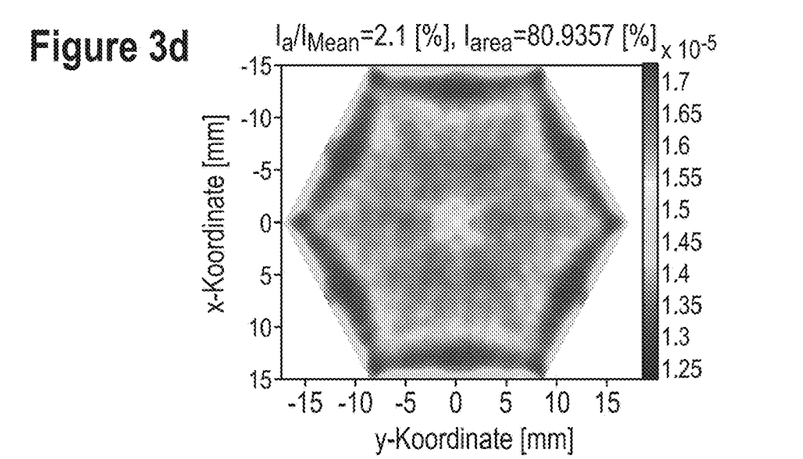
Figure 3E:
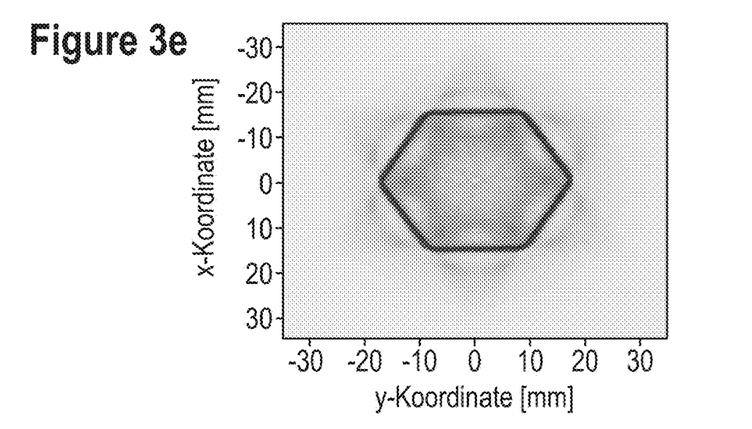
Figure 3F:
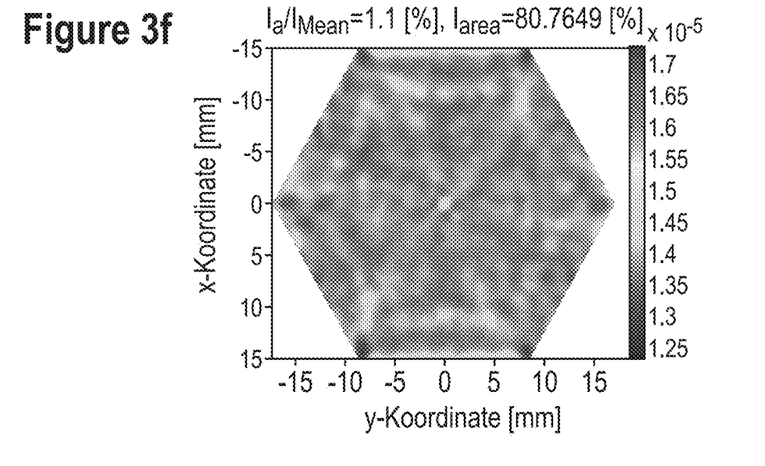

FIGS. 3c,d show the irradiance distributions after the first iteration step. The intensity is redistributed by applying the compensation factors during ray-mapping within the primary target distribution. FIG. 3d shows a superimposed irradiance distribution having a value of intensity fluctuation of 2.1%. The comparison between FIG. 3d and FIG. 3b illustrates that the intensity maximum in the central area of the irradiance distribution and the differences between the energy levels of the individual segments of the FF structure were leveled by the compensation factors. FIGS. 3e,f show the irradiance distributions after the 10th iteration step. Through the iterative application of the compensation factors, the value of the intensity fluctuation was reduced to 1.1%.

Figure 4:
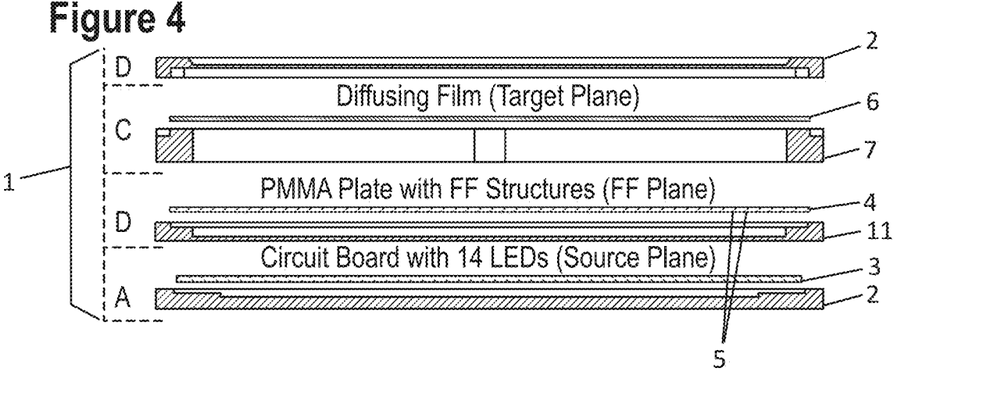
FIG. 4 shows a schematic illustration of the arrangement of the different components of an exemplary optical apparatus according to the invention.
Figure 4B:
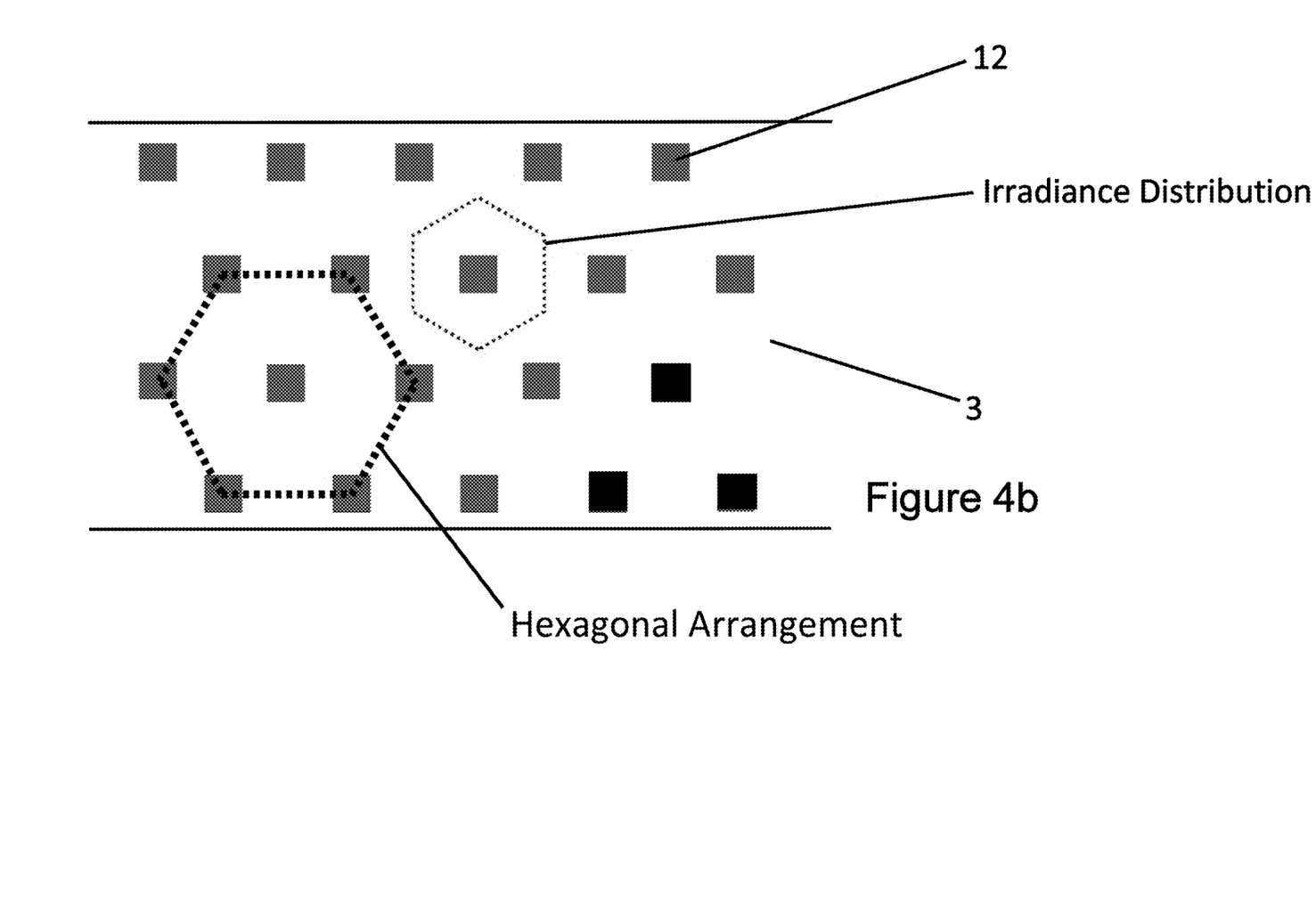
FIGS. 4b-4c show LEDs arranged on a circuit board in a hexagonal pattern and in a square pattern, respectively.
Figure 4C:
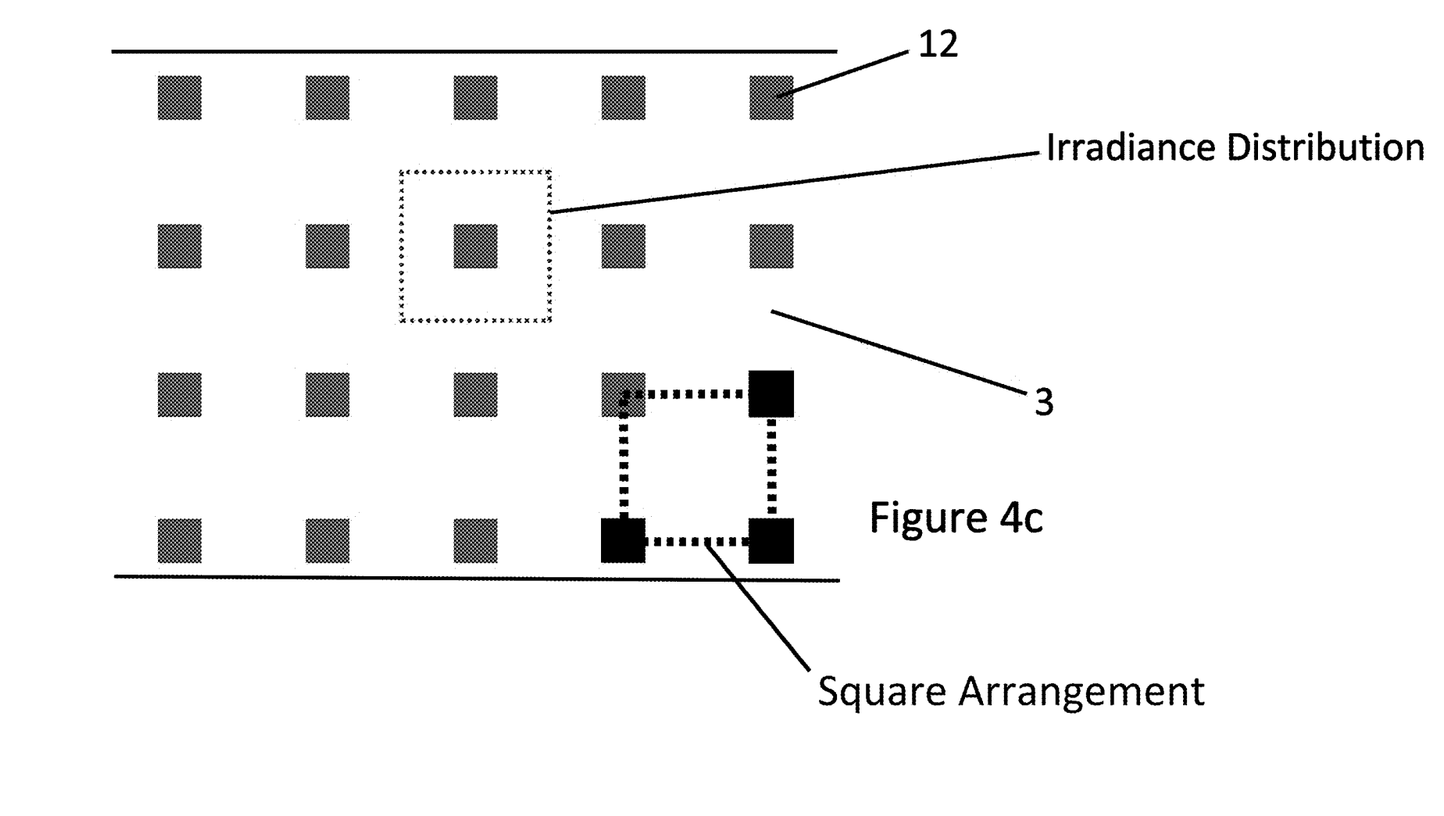

FIG. 4 illustrates an exemplary arrangement of different stackable components of an embodiment of the direct-lit luminaire apparatus according to the invention. The apparatus 1 comprises housing components 2, a circuit board 3 with low power LED light sources, a polymethyl methacrylate (PMMA) plate 4 with the FF structures 5 and a diffusing device 6 at the top side of the direct-lit luminaire apparatus. The circuit board 3 and the PMMA plate 4 are separated by a first spacer element 11 to create a distance of 2 mm between the source plane and the FF plane. A second spacer element 7 between the PMMA plate and the diffusing device has a thickness of 8 mm resulting in a total distance of 10 mm between the source and the target plane. The LEDs 12 on the circuit board 3 have an active surface of 0.5×0.5 mm², emitting white light and are arranged in a hexagonal array, as shown in FIG. 4b. FIG. 4c shows the LEDs 12 on the circuit board 3 arranged in a square pattern.

Figure 5A:
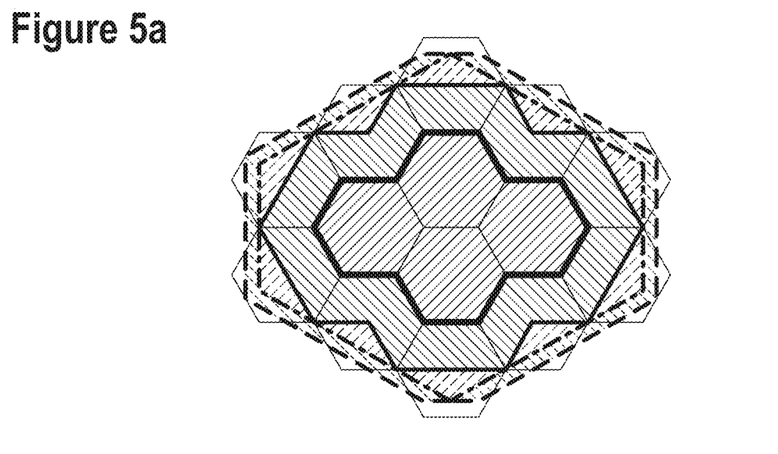
FIGS. 5a-d show a scheme wherein the irradiance distribution of the exit surface of the apparatus is divided into different areas and associated irradiance distributions resulting from the division.
Figure 5B:
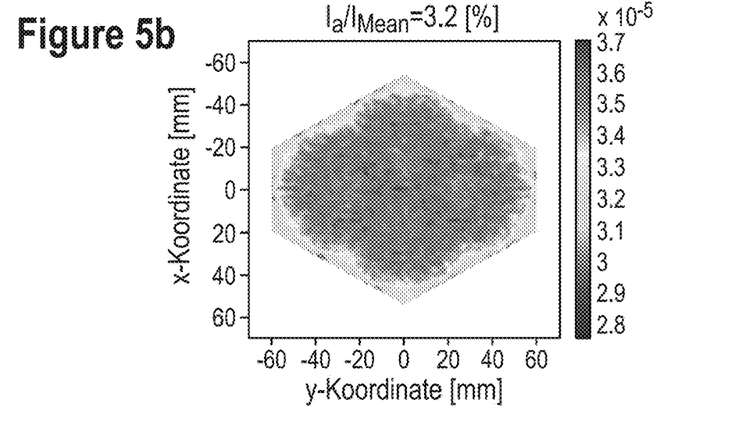
Figure 5C:
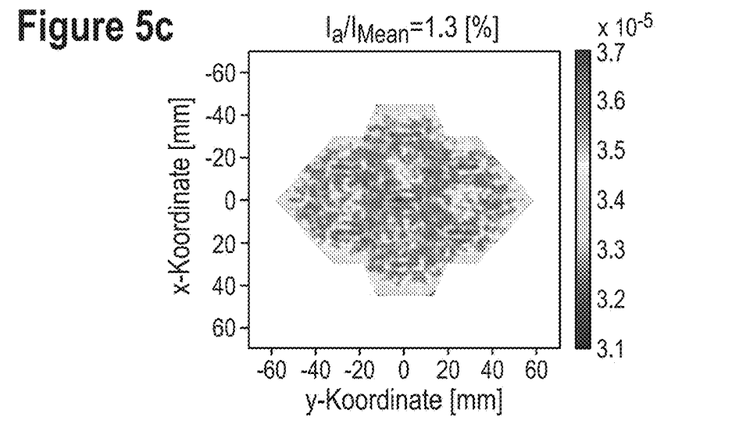
Figure 5D:
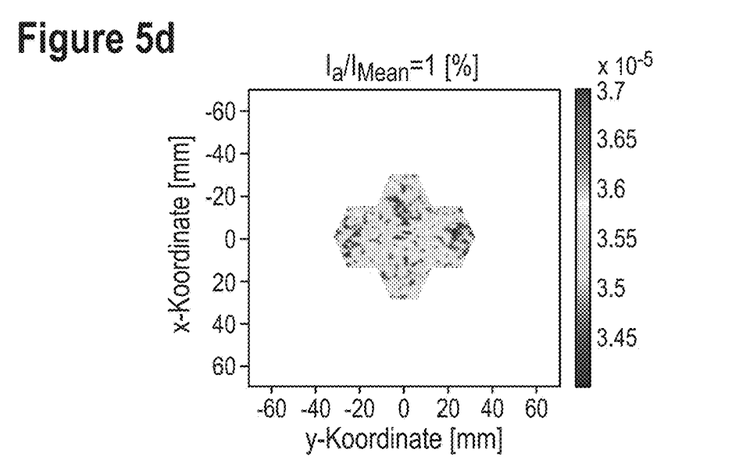

FIG. 5a shows a schematic representation of the arrangement of hexagonal primary target distributions of a FF structure in the optical apparatus. To illustrate border effects, the arrangement is divided into different areas. The area framed by the first line 8 of FIG. 5a corresponds to an aperture whose area is completely covered by the hexagonal target distributions of the individual FF structures. FIG. 5b shows the irradiance distribution corresponding to this area. The value of the intensity fluctuation is 3.2%. The area enclosed by the second line 9 comprises the area of the irradiance distribution shown in FIG. 5c, which is completely covered by primary and secondary target distributions (superposition of hexagonal and triangular target distributions). Due to the concept of superposition of primary and secondary irradiance distributions of adjacent FF structures, the irradiance distributions generated by the FF structures in the target areas are optimized such that only a superposition of a primary and secondary target distribution produces a homogeneous irradiance distribution on the target plane of the apparatus. FIG. 5c illustrates that this region has a very small value of intensity fluctuation of 1.3%. The area defined by the third line 10 comprises the central four primary target areas completely covered by adjacent distributions. The iterative optimization of the irradiance distributions of the individual FF structures is carried out taking into account the presence of adjacent distributions. FIG. 5d shows that this area has a comparable value of intensity fluctuation (1%) as the superimposed central intensity distribution of the single structure.

Figure 6A:
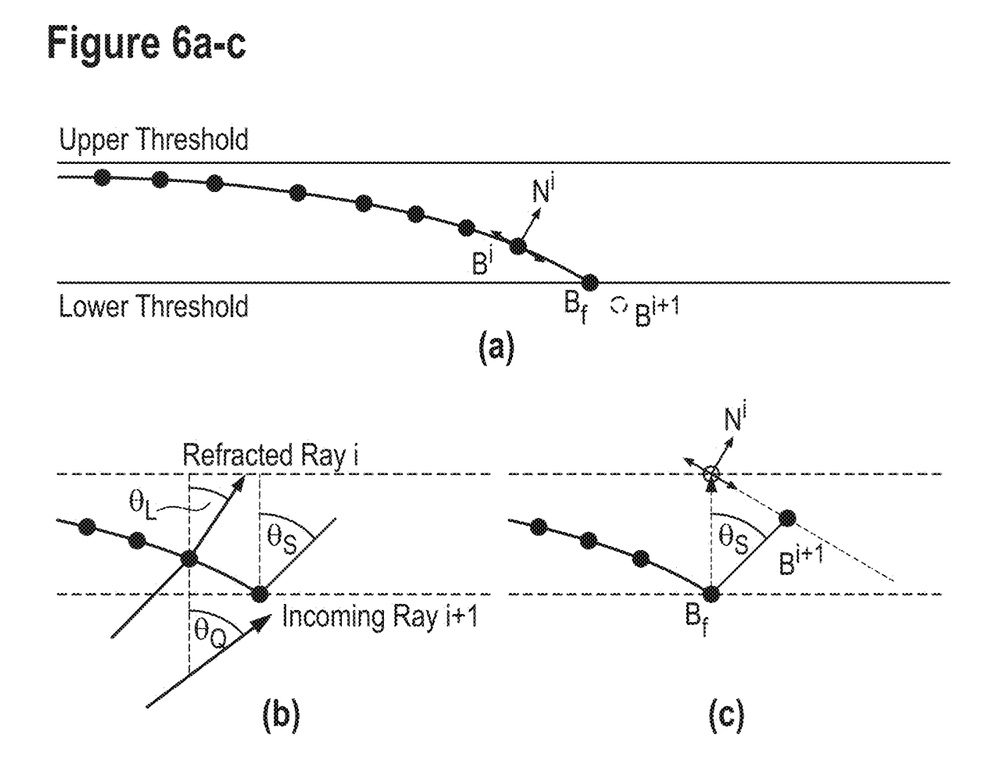

FIGS. 6a-c show a working scheme of the transformation algorithm to restrict the maximal height of the FF curve during the calculation. When a point $B^{i+1}$ of the FF curve falls below a lower threshold value, the FF curve is intersected with the base line of the lower threshold value. In this way a base point $B_f$ is determined and added to the FF curve which is located at the base line of the lower threshold value, FIG. 6a.

The gradient of the artificial intersection line has to be adapted in dependence of the propagation direction of incoming rays from the LEDs and the propagation direction of refracted rays inside the FF-structures to minimize light refracted by the artificial intersection lines of the FF-curve (see FIG. 6b). In order to find an adequate angle $\Theta_s$ for the artificial intersection line the propagation angle of the refracted rays $\Theta_L$ at the point $B^1$ and of the incoming rays $\Theta_Q$ towards the point $B^{i+1}$ are determined. The next point $B^{i+1}$ of the FF curve is determined by executing the following construction scheme: The base point $B_f$ is shifted towards the upper threshold, where a construction line is created using the normal vector $N^i$. The construction line is intersected with the artificial intersection line to determine the position of the new point $B^{i+1}$. In this way the height of the intersections of the FF-curve is minimized and prevents shading of refracted r iays inside the FF-structure.

What is claimed is:

1. An optical apparatus operable to emit light with a homogenized radiance distribution, the apparatus comprising:
    a plurality of light sources, arranged in an array;
    a diffusor device at an exit surface of the apparatus;
    a transparent substrate, arranged between the plurality of light sources and the exit surface, the substrate comprising a plurality of freeform (FF) optical structures, wherein the freeform optical structures are arranged on a bottom side of the transparent substrate facing the plurality of light sources,
    wherein the optical apparatus has a distance-to-height ratio (DHR) greater than 2, the DHR being the ratio between a distance between the plurality of light sources and a distance between the plurality of light sources and the exit surface,
    wherein a geometry of each of the plurality of freeform optical structures on the transparent substrate is defined by a freeform curve such that a thickness of each freeform optical structure positioned on the bottom side of the transparent substrate is limited by a lower threshold value and an upper threshold value;
    wherein the freeform curve includes at least one point positioned at an unadjusted position which is located below the lower threshold, and the at least one point is repositioned to an adjusted position located between the upper and lower thresholds;
    wherein the adjusted position of the at least one point is determined based on an artificial intersection line extending from a reference point on the freeform curve intersecting the lower threshold;
    wherein an adequate angle is determined between the artificial intersection line and a normal intersecting the upper threshold, the adequate angle being determined in dependence on a propagation direction of an incoming ray from the plurality of light sources and a propagation direction of a refracted ray inside the freeform optical structures;
    wherein a point of impingement with the upper threshold of an adjacent ray is determined which extends from a second reference point on the freeform curve, located between the upper and lower thresholds and adjacent to the reference point; and wherein the adjusted position is determined at the intersection of a reference vector, extending from the point of impingement and normal to the adjacent ray, and the artificial intersection line.

2. The apparatus according to claim 1, wherein the superposition of a primary irradiance distribution and a secondary irradiance distribution of the freeform optical structures creates a homogenized irradiance distribution on the diffusor device.

3. The apparatus according to claim 1, wherein the arrangement of the plurality of light sources is hexagonal-shaped or square-shaped.

4. The apparatus according to claim 1, further comprising at least one of: a first spacer component disposed between the plurality of light sources and the transparent substrate to create a distance between the plurality of light sources and the transparent substrate; and, a second spacer component disposed between the transparent substrate and the diffusor device to create a distance between the transparent substrate and the diffusor device.

5. The apparatus according to claim 1, further comprising a housing, wherein a surface of the housing is light-absorbing.

6. The apparatus according to claim 1, wherein the transparent substrate forms a plate and consists of polymethyl methacrylate.

* * * * *